Jan. 9, 1923.
J. J. NAUGLE.
FILTER PLATE.
FILED APR. 29, 1919.
1,441,445.
2 SHEETS—SHEET 1.
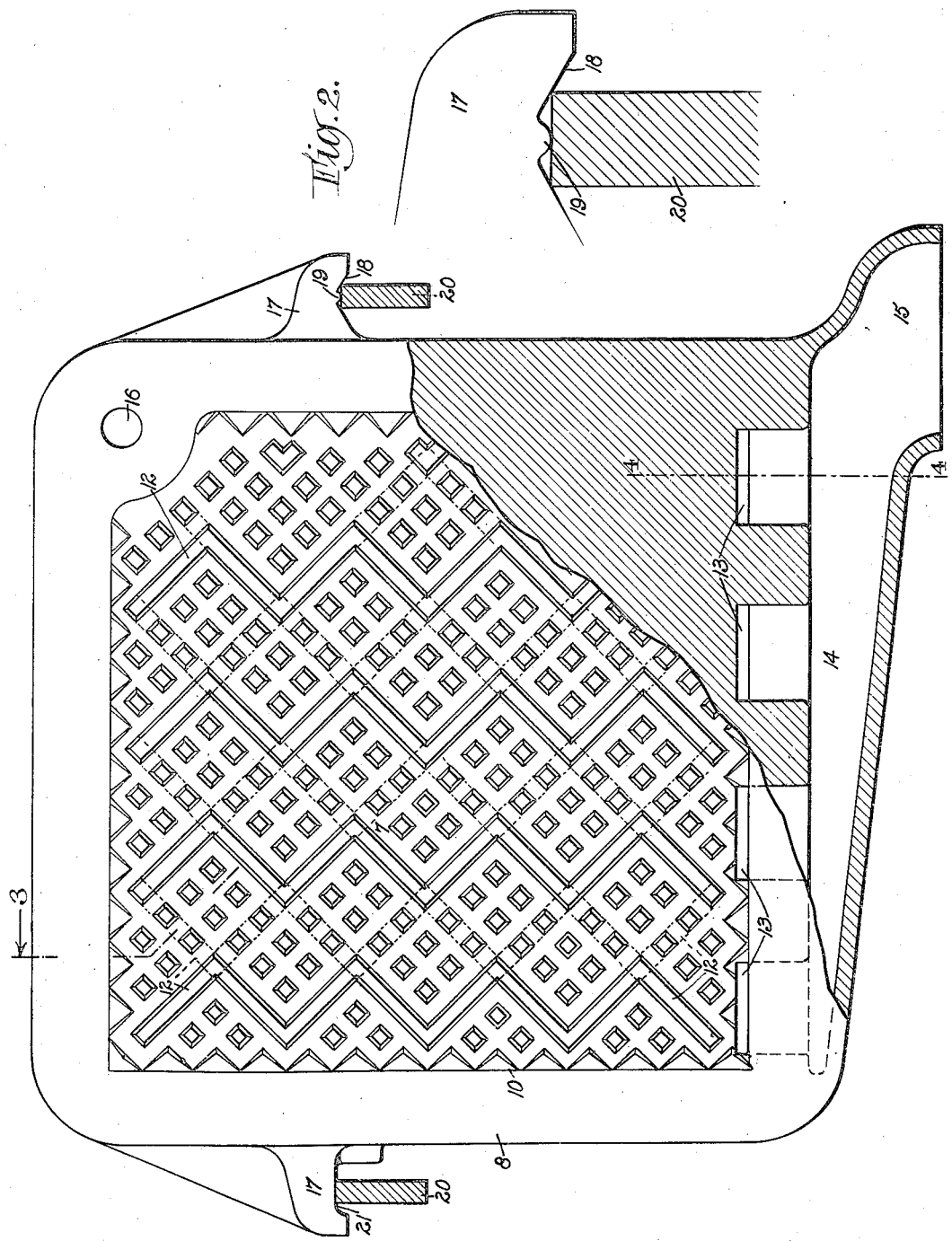
WITNESSES
Frederick Diehl.
B Joffe
INVENTOR
J. J. Naugle
BY
ATTORNEYS

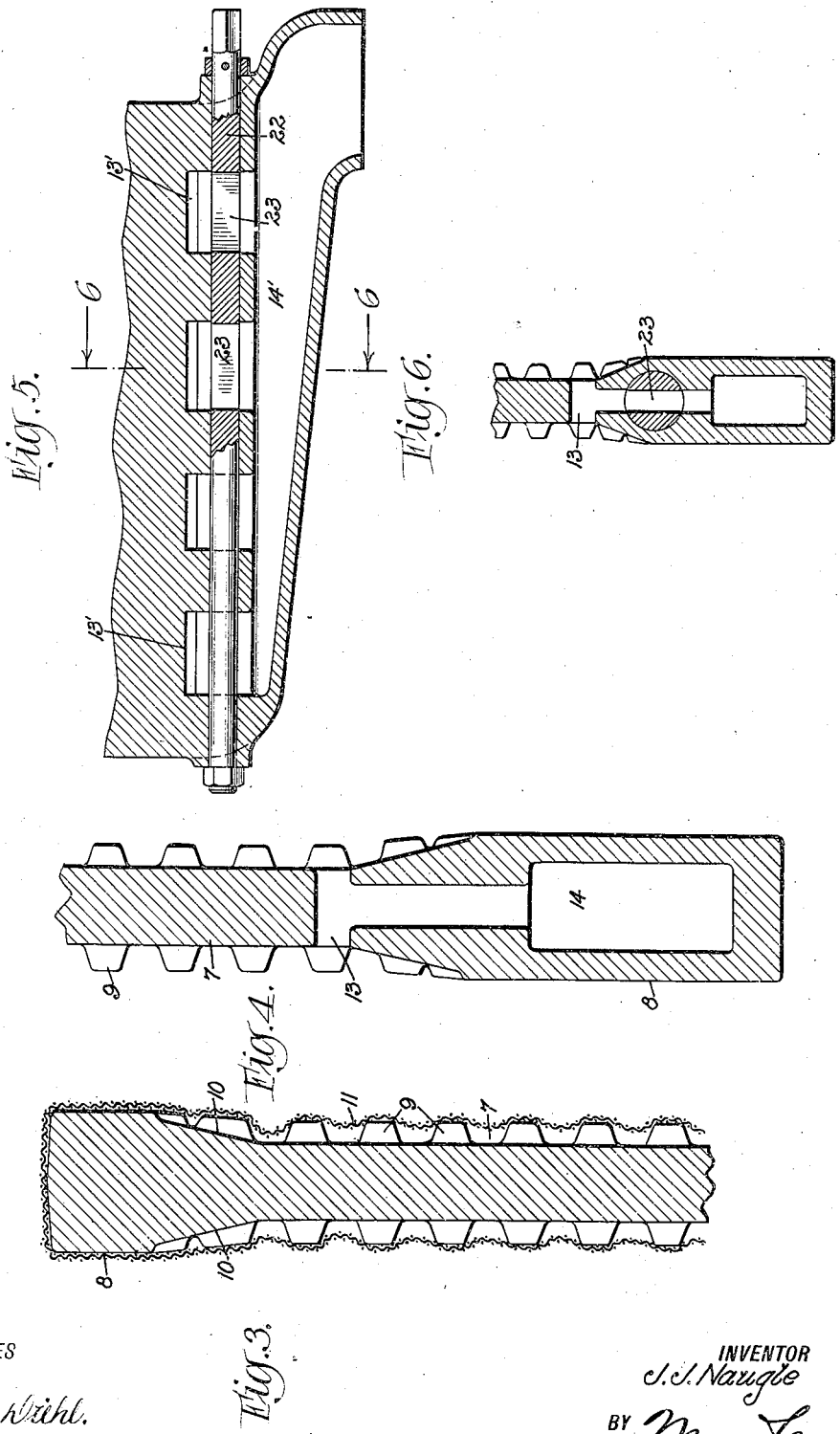

Patented Jan. 9, 1923.

1,441,445

UNITED STATES PATENT OFFICE.

JOHN J. NAUGLE, OF BROOKLYN, NEW YORK, ASSIGNOR TO UNITED FILTERS CORPORATION, OF NEW YORK, N. Y., A CORPORATION OF DELAWARE.

FILTER PLATE.

Application filed April 29, 1919. Serial No. 293,457.

*To all whom it may concern:*

Be it known that I, JOHN J. NAUGLE, a citizen of the United States, and a resident of the city of New York, borough of Brooklyn, in the county of Kings and State of New York, have invented a new and Improved Filter Plate, of which the following is a full, clear, and exact description.

My inventiton relates to plates used in connection with filter presses. An object of the invention is to provide a simple and efficient plate having protuberances on the surface thereof bridged to increase the strength of the plate.

Another object of the invention is to provide a self-centering plate.

A further object of the invention is to provide a filter plate of the class described having a series of outlets from the filtering surface.

A still further object of the invention is to provide a filter plate which will reduce the liability of the filtering fabric to tear at the junction of the filtering surface and the framing surface of the filter plate.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in all the views.

Figure 1 is an elevation of a plate embodying my invention, a portion of which is in section to show the details of construction;

Fig. 2 is an enlarged elevation of the arm for centering the plate;

Figure 3 is an enlarged section on line 3—3, Fig. 1, the filtering fabric being shown on the plate;

Figure 4 is a section on line 4—4, Figure 1;

Figure 5 is a modified structure of the plate illustrating the multiple outlets controlled by a valve; and Figure 6 is a cross section on line 6—6, Figure 5.

Referring to the drawings, 7 is the studded filtering surface of the plate which is bordered or framed by a plain surface 8, the studs 9 being frustums of pyramids symmetrically disposed on the filtering surface. The plain surface 8 is joined to the bottom of the filtering surface by an inclined surface or bevel 10. The studs or protuberances rising from that bevel have their top surface on an incline, tending to merge the framing surface with the common top surface of the studs if said studs are depressed from the framing surface. This bevel 10 eliminates the abrupt junction of the filtering surface with the framing surface and forms an additional support at the junction for the filtering medium or fabric 11, thereby preventing the breaking or tearing of the fabric at the junction of the two surfaces. This is the point where the fabric is subjected to the most severe strain, due to the filtering under pressure, particularly when the joining edge is a sharp one.

In cases where the filtering surface is subjected to high pressure it is advisable to reenforce that surface, and for this purpose I provide ridges 12 of zigzag shape disposed in spaced parallel relation with each other and with the rows of prismatic projections and studs formed on the filtering surface, the zigzag-shaped ridges on the opposite filtering surface of the same plate being directed oppositely, as will be seen from Fig. 1, where the ridges on the under side are indicated in dotted lines. It will be noted that these ridges are so formed that a vertical line cannot be drawn which will not cross the ridges on either of the surfaces. Preferably, the arms of the zigzag-shaped ridges are at right angles to each other and diagonal with reference to the plate. Although these ridges decrease slightly the filtering area of the plate, they increase considerably the rigidity of the plate. They are shown to run from the top to the bottom of the plates so as not to interfere with the movement of the matter to be filtered toward the outlets 13 provided near the lower end of the plate, preferably at the junction of the bevel 10 with the bottom of the filter surface 7. By providing a number of such outlets from the filtering surface, the matter to be filtered is entirely removed from said surface, thus reducing the resistance to filtration. The said outlets lead to a common passage or channel 14 provided in the lower part of the plate, which passage terminates with a discharge opening 15.

To facilitate the centering of the filter plates, that is, the registration of the aperture 16 of the plates of the filter, I provide one of the supporting arms 17 of the plate with a V-shaped supporting surface 18, in the apex of which V I form a section of a cylinder 19, the curved surface of which is to bear on the supporting bar 20 of the press. The other arm 17 has a plain bearing surface 21, preferably slightly recessed, to limit the movement of the plate on the corresponding supporting bar 20. In mounting the plates, the arm 17 having the recessed bearing surface 21 is first placed into engagement with a corresponding supporting bar 20. When the arm 17 having the V-shaped bearing surface is brought down to engage the corresponding supporting bar 20, the sides of the V will tend to displace the plate if it is not properly centered with its bar, the curved surface of the cylindrical section 19 facilitating the movement and also helping to center the plate.

In the modified structure shown in Figs. 5 and 6, there is a valve 22 interposed between the outlets 13' and the channel 14'.
This valve has a plurality of apertures 23 spaced so as to register with the corresponding outlets 13'. By operating the valve any of the plates can be cut off from the series of filter plates.

I claim:

1. A filter plate having a depressed filter surface framed by a plain raised surface, the filter surface and the plain surface being joined by an inclined surface, studs rising from the filter surface, and studs rising from the inclined surface and having their top surfaces inclined in a plane extending from the top of the studs on the filter surface to the raised surface.

2. A filter plate having a plurality of connected diagonally arranged ribs extending across the filter surface thereof.

3. A filter plate having a plurality of zigzag ribs extending across each filter surface thereof, the ribs on one of the filter surfaces being in staggered, overlapping relation to the ribs on the opposite filter surface.

4. A filter plate having a plurality of diagonally arranged ribs extending across each filter surface thereof, the said ribs upon each filter surface being arranged in spaced relation and in substantial longitudinal alinement with each other, and the ribs upon one of said filter surfaces bridging the spaces between the ends of the ribs upon the opposite filter surface.

5. A filter plate having a studded filter surface on each face, means bridging some of the studs of the filter surface to form zigzag reenforcing ridges thereon, the ridges on the opposite faces of the plate being in staggered relation and overlapping to prevent rupture on a straight line.

6. A filter plate having a studded filter surface on each face, means bridging some of the studs of the same filter surface to form zigzag-shaped ridges disposed in spaced parallel relation on the same surface, the ridges on the opposite faces of the plate being in staggered relation and overlapping in projecting on one another at the apexes of the zigzag-shaped ridges whereby a rupture in a straight line is prevented.

7. A filter plate having a studded filter surface on each face, means bridging some of the studs on the same filter surface to form zigzag-shaped ridges thereon disposed in spaced parallel relation, the ridges on the opposite faces of the plate being in staggered relation and running in opposite directions, the apexes of the ridges on the opposite faces overlapping in projecting on one another to prevent rupture on a straight line.

8. A filter plate having a supporting arm provided with a concave bearing surface, and a lug projecting from the base of said concave bearing surface.

9. A filter plate having a supporting arm provided with a convex cylindrical bearing surface and a notch forming a guide for said cylindrical bearing surface.

10. A filter plate having a supporting arm provided with a notch, and a convex cylindrical bearing surface in said notch.

11. A filter plate having a filter surface, a discharge passage in the lower part of said plate, provided with a discharge outlet at one end thereof and a plurality of spaced passages extending from said filter surface and communicating with said passage.

12. A filter plate having a filter surface, a discharge passage in the lower part of said plate provided with a discharge outlet at one end thereof, said passage extending substantially the full width of said plate, and a plurality of spaced passages extending from said filter surface and communicating with said passage.

13. A filter plate having a filter surface upon each side thereof, a discharge passage in the lower part of said plate, provided with a discharge outlet at one end thereof and a plurality of spaced passages extending from said filter surfaces and communicating with said discharge passage.

14. A filter plate having a filter surface and a discharge passage at the lower edge thereof, said filter plate having a plurality of outlet openings leading from said filter surface to the discharge passage, and valve means for controlling communication between said outlet openings and said discharge passage.

15. A filter plate having a studded filter surface on each face, and a channel in the lower part of the plate extending substantially through the entire width and terminating with an outlet, said plate having a plurality of passages leading from one filter surface to the other near the lower part of the filter surfaces, said plate having also means establishing communication between each of the said passages with the channel.

16. A filter plate having a filter surface on each face and a channel terminating with an outlet near the bottom of the plate, said plate having a plurality of passages crossing the plate and establishing communication between the filter surfaces, and a valve controlling the communication between said passages and the channel.

17. A filter plate having a filter surface, and a discharge passage communicating with said filter surface, said passage having one of its ends closed and the other of its ends open and being of increasing cross-sectional area from its closed end to its open end.

JOHN J. NAUGLE.